Nov. 12, 1935.  R. W. STANLEY  2,020,480
VARIABLE SPEED DEVICE
Filed May 5, 1932   4 Sheets-Sheet 2
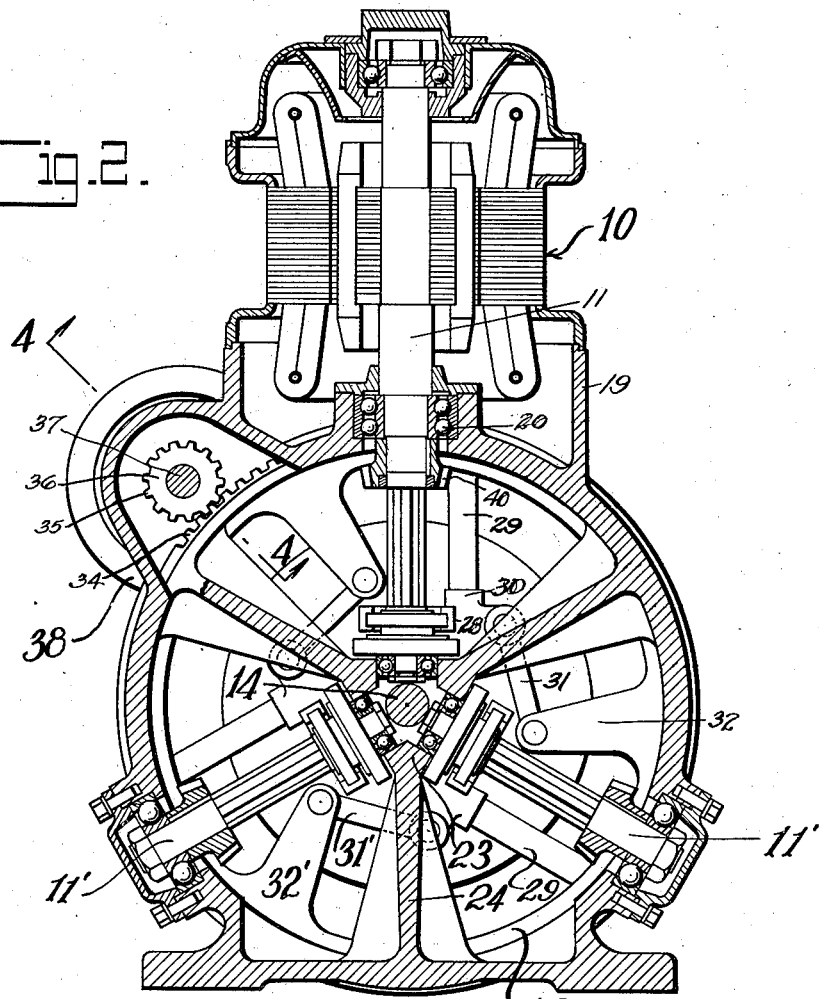
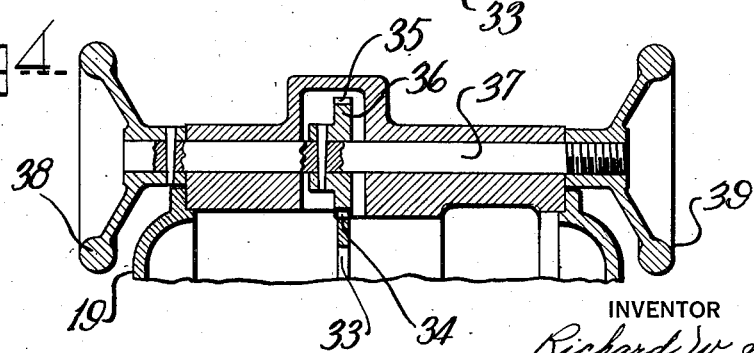
INVENTOR
Richard W. Stanley
BY
Warfield & Brown
ATTORNEY

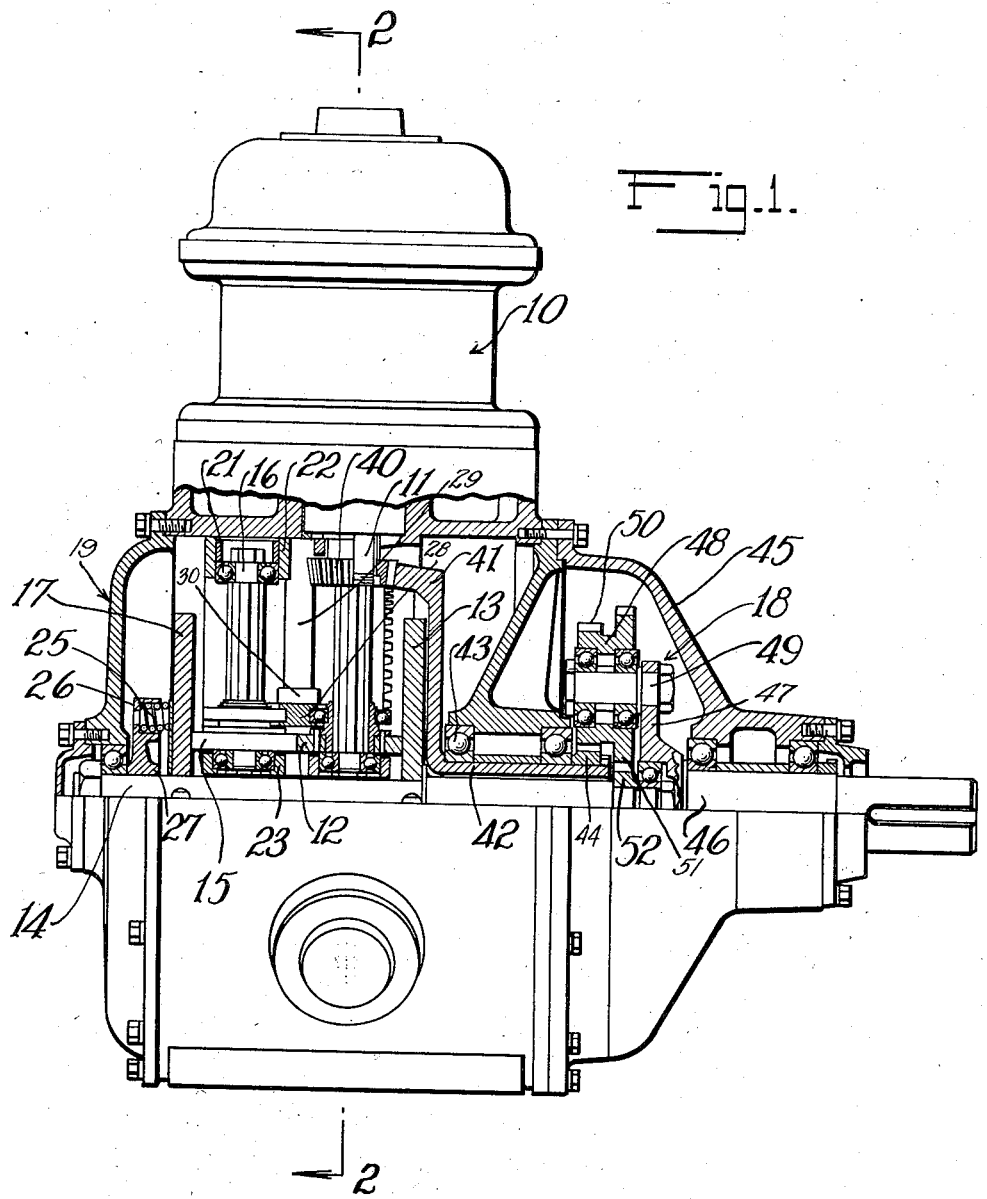

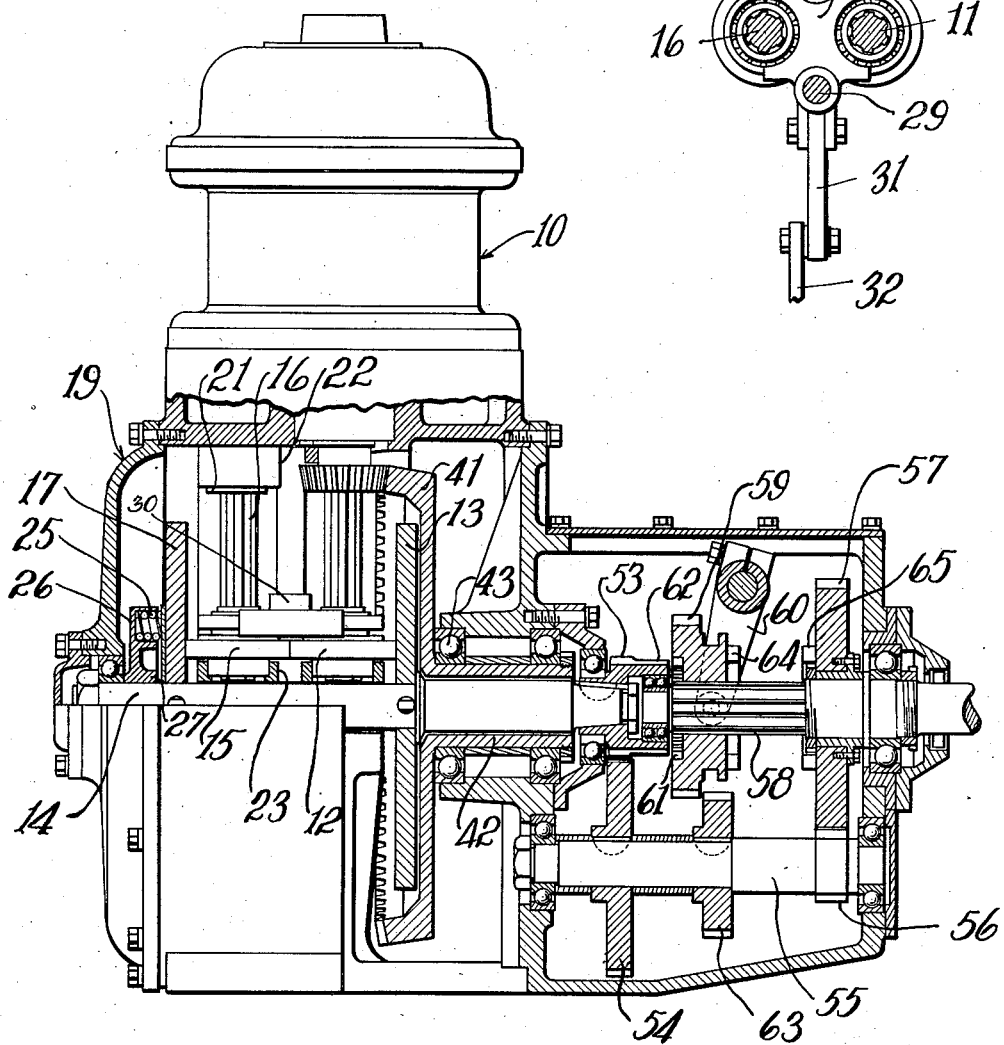

Nov. 12, 1935.   R. W. STANLEY   2,020,480
VARIABLE SPEED DEVICE
Filed May 5, 1932   4 Sheets-Sheet 4

INVENTOR
Richard W. Stanley
BY Warfield & Brown
ATTORNEYS

Patented Nov. 12, 1935

2,020,480

UNITED STATES PATENT OFFICE 2,020,480

VARIABLE SPEED DEVICE

Richard W. Stanley, Lockport, N. Y.

Application May 5, 1932, Serial No. 609,377

12 Claims. (Cl. 74—285)

This invention relates to variable-speed transmission systems and more specifically to such a system wherein is incorporated planetary gearing.

This is a continuation in part of my co-pending application, Serial Number 582,358, filed December 21, 1931, for variable-speed transmission systems.

In general, it is an object of the invention to provide a device of the character described, which will efficiently perform the purpose for which it is intended, which is simple and economical of construction, which can be conveniently operated and which may be readily manufactured and assembled.

Another object of the invention is to provide such a device wherein the relative angular displacement of a plurality of parts, which causes the change of speed, is affected by the simple displacement of one element and a slight pivotal displacement of links attached thereto.

Another object is to provide a variable speed device wherein power delivered directly to one train of elements is in part diverted to other trains of elements at various angles with the first train through a single structure part which is mechanically strong.

Another object of the invention is to provide a variable speed device having a broad output range, which incorporate an epicyclic arrangement using the input speed and a middle-range speed.

Another object is to provide a variable speed device with an epicyclic arrangement wherein a single element couples a plurality of power trains and also couples the motive source with a portion of said arrangement whereby a singularly unified and compact structure and operation are obtained.

Other objects of the invention will in part be obvious and will in part appear hereinafter.

The invention accordingly comprises the features of construction, combinations of elements, and arrangement of parts, which will be exemplified in the construction hereinafter set forth and the scope of the application of which will be indicated in the claims.

For a fuller understanding of the nature and objects of the invention reference should be had to the following detailed description taken in connection with the accompanying drawings, in which:

Fig. 1 is a view in side elevation, partly in section and with a portion cut away of a variable-speed power-transmitting mechanism constructed in accordance with the invention;

Fig. 2 is a section in elevation of the device shown in Fig. 1 taken along the line 2—2;

Fig. 3 is a view similar to Fig. 1 of a modification of the device shown in Fig. 1;

Fig. 4 is a view in cross section of a detail taken along the line 4—4 of Fig. 2;

Fig. 6 is a section in side elevation, partly in section and with a portion cut away of a modification of the device shown in Fig. 1.

Figure 5:
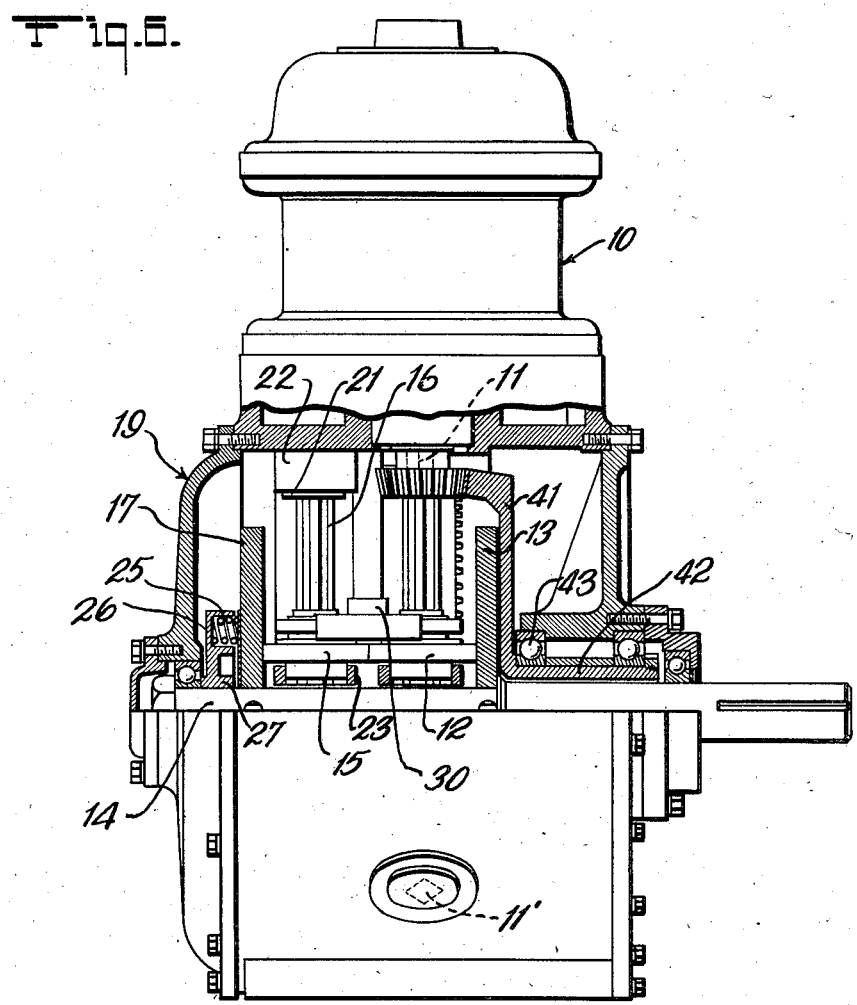
Fig. 5 is a fragmentary view, in section, of a detail of the device shown in Fig. 1.

In mechanisms which transmit power from shafts rotating at one speed to shafts which are to be rotated at other speeds, it is of importance that the entire device be compact so that the strains may not be magnified by transmission across distances which would add a lever factor. It has been found that relatively great strength, sureness of operation and stability are attained by transmitting the energy through a multiplicity of power trains and particularly by having each train subdivided into a plurality of paths. Variable speed devices in general appear to have inherent weaknesses. It has been discovered that balance plays an astonishingly large part in the correct functioning of these machines. It has been found also that stresses ordinarily found in machines may not be tolerated in variable-speed devices or that their extent must be limited. All these discoveries do not merely make a good device run more smoothly, but rather they take the art out of the almost inoperative stage and leave it with an efficient, long-wearing and powerful instrument.

As will be hereinafter described, the present invention includes the aforementioned discoveries. Compact multiple power trains carry energy from a motive source to a driven shaft. These are built radially extending from the shaft whereby the parts may be surely controlled together and almost by a single element. Each train comprises two paths. Power from that train attached to the source is diverted to the other trains through a single intermediate element. This element serves another purpose—it supplies an epicyclic gearing with a constant-speed motion, which is compounded with the other speed derived from the trains to give a final speed having a relatively great possible variation.

In the specific form shown in the drawings, 10 indicates a motor connected to a shaft 11. A roller 12 keyed on shaft 11, contacts with a disk 13 fixed on a main shaft 14 to which shaft 11 is radial. A roller 15, keyed on a shaft 16, parallel to shaft 11, contacts with the first roller and with a second disk 17 on the main shaft 14. Thus the power train has two paths—one through each disk from the motor to the main shaft. A plurality of similar pairs of shafts 11' and 16' with rollers, extend from the main shaft 14 in different directions and receive power from shaft 11 through suitable means, preferably single. This means may also act to supply a constant-speed motion to the epicyclic gearing shown generally at 18. Other means are provided for simultaneously moving the pairs of rollers along the radii of the disks.

Any suitable motive means may take the place of the motor 10. The motor may be attached to the main casing 19 of the device. The shaft 11 may be journaled in this casing by means of ball bearings 20 and the shafts 11' by the ball bearings 21. The idling shafts 16 and 16' are journaled in a suitable frame or spider 22, which is fitted into the casing and secured against rotation. All of the shafts are supported at their inner end by a central hub-like portion 23, which itself is supported on arms 24, extending inwardly from the casing 19. The main shaft 14 extends through these hub portions and is journaled in the casing by means of ball bearings, for example.

In order that the elements which are in rolling contact, such as the roller 12 and disk 13, may transmit power with a relatively high degree of efficiency, these elements are arranged to engage with uniform bearing pressures and to have an associated train for reactively transmitting a portion of the power in a manner which balances the thrust. The elements hence should adhere constantly and run without slip. The materials employed in the construction of these elements are selected with reference to this characteristic. Hardened steel is an example of a suitable material for both the roller and the disk.

The associated train for thus transmitting a portion of the power through a different path to the shaft 14, comprises a second disk 17 which is non-rotatably mounted on the power-transmitting shaft within the casing 19 and spaced from the disk 13 a sufficient distance to accommodate the roller 12, together with a second roller 15, which may be disposed in contact with the roller 12. The pair thus provided divides the power being transmitted and by their mutual reactions balances the bearing thrusts against the disks 13 and 17. In order that the bearing pressure may be uniform between the disks and rollers, means are provided to keep the rolling contacts between these elements constant. To this end one disk, for example, that at 13, is made fast to the shaft 14, while the other is arranged to have a limited motion thereon under elastic restraint. Suitable resilient means are arranged to provide the elastic restraint, such means being embodied in the helical springs shown at 25 arranged yieldingly to urge the disk 17 toward the disk 13, whereby the disks and rollers are in contact under uniform pressure. The springs 25 are here retained by means of socket-like formations 26 in a spider 27, which is rigidly secured on the shaft 14 adjacent the disk 17.

The speed variations desired are effected in the present mechanism by moving the roller 12 and its associated roller 15 along the shafts 11 and 16, so as to vary their bearing points on the disks 13 and 17. This is conveniently accomplished by providing yokes 28 respectively between the parallel shafts 11 and 16, 11' and 16', etc. A pair of rollers 12 and 15 are journaled within each of these yokes, which are slidable along supporting means. The supporting means may be pins 29 fixed to the casing and the hub portions and parallel respectively to one of the pairs of shafts 11 and 16. A portion of each yoke forms a sleeve 30, which embraces one of the pins. Suitable means are supplied for simultaneously moving each of the yokes and its attached rollers. As shown, links 31, 31', etc. pivotally connect the respective sleeves and arms 32 which project inwardly from a ring 33, which is mounted in a bored section of the casing 19 around its inner periphery. It is evident that there are a plurality of units angularly spaced about the main shaft 14 and that each unit comprises an arm 32, a link 31, and a sleeve 30 on a pin 29 and forming part of a yoke 28, which holds two rollers 12 and 15 on a shaft 11 and a parallel idling shaft 16, respectively.

The ring 33 may be relatively narrow if constructed of steel and may be retained in place by the pins 29. It is adapted to be rotated by any desired means. For a sufficient distance along the periphery of the ring teeth 34 may be formed for engaging teeth 35 on a gear 36, which is on a shaft 37, journaled in the casing 19. On the outer end of said shaft there may be an adjusting handwheel 38 and a position-locking handwheel 39.

In order that the rollers may all rotate at the same rate, means are provided for driving the shafts 11' directly from shaft 11 and preferably with a single intervening element which has a motion differing from that of the shafts. In a preferred arrangement there are fixed at the outer end of the shafts 11 and 11' bevel pinions 40 which mesh with bevel teeth on the outer rim of a member 41. This member is rotatably positioned on the main shaft 14 beyond the disk 13. The pinions and teeth are at a distance from the shaft 14 greater than the radius of the disk 13, and either the one or the other extends across the plane of the disk. The member 41 has an integral sleeve 42 which extends along the main shaft 14 and through the casing 19. Anti-friction ball bearings 43 may lie between the sleeve and the casing. Integral with the other end of the sleeve or attached thereto there may be a pinion 44 for a purpose hereinafter described.

Anti-frictionally supported in a supplementary portion 45 of the casing is a final output shaft 46, coaxial with the main shaft 14. Connected with the output shaft is an assemblage for increasing the final variation in speed. This may be an epicyclic train arranged as follows: A planetary disk 47 fixed to the shaft 46 supports at least one or better an even number of diametrically-arranged compound pinions 48 which are free to rotate on separate studs 49. The pinion 50 meshes with the teeth or pinion 44 on the member 41 and the other pinion 51 meshes with a pinion 52 fixed on the main shaft. The pinion 44 rotates at the constant speed of the member which derives its motion from the constant-speed motor 10 while the pinion 52 rotates with the variable speed of the disks 13 and 17. Operating under the laws of epicyclic gearing, the speed ratio obtainable with the disks alone is multiplied at will depending on the number and pitch of the teeth on the various pinions. The speed of the output shaft may vary from a minimum number, for example, zero, up to a predetermined number of rotations per minute, or by a proper selection of variables the speed may be zero when the rollers are at some given position on the disks and be clockwise or counterclockwise depending upon whether or not the rollers are a greater or less distance from the axis of the disks. The compound action of the member 41 in driving the shafts 11 and in supplying the epicyclic gearing with a constant speed of rotation, gives a peculiarly solid, well-balanced, unitary, mechanical action.

The supplementary casing and gearing therein may be dispensed with and the main shaft 14 used to deliver the power (see Fig. 6). In a very simple device the member 41 may also be eliminated by attaching separate motion means such as a motor to each of the shafts 11'.

The motor 10 is preferably one with a constant speed or a shunt characteristic, the speed variation in consequence being obtained solely by rotating the handwheel 38 which causes movement of the rollers radially across the disks from an inner engaging point where the disks are driven at maximum speed for the arrangement shown to a point near the outer periphery of the disks where the rollers drive the disks at a minimum speed. It should be noted, however, that due to the constant pressure, whatever the speed of the shaft 14, the horsepower output of the motor and hence of the device itself is substantially constant, the speed and the torque varying inversely. The motor shown at 10, while here indicated as of the induction type for use on alternating current, may be of any convenient type having the desired characteristic as the motor per se is no part of the present invention.

The operation of the device described is as follows: The motor 10 rotates the shaft 11 and the roller 12 slidably keyed thereto. The other shafts 11' are rotated through the common bevel gear of the member 41 simultaneously with and deriving power from shaft 11. The rollers on shafts 11 contact with and divide their output between the disk 12 and the rollers 15 on the idling shaft 16. The latter rollers pass the power on to the disk 17 with which they are in contact. The power from the motor 10 is thus substantially all delivered through the multiplicity of paths to the main shaft 14. The variation in speed of the main shaft is secured by changing the distance from the disks' axes of the point of contact between the rollers and the disks. The rollers are moved radially and simultaneously an equal amount. Each pair 12 and 15 are supported by a separate yoke 28, which slides along its own fixed pin 29. The yokes are all linkedly connected to the ring. By manipulating the handwheel the ring is rotated and its motion is communicated through the links and yokes to the pairs of rollers whereby they are shifted in unison. The diameter to length ratio of yoke should be ample to prevent binding and to provide lasting service. The angle formed by the center line of a link and a pin is not so acute that proportions of the pivot diameters at the ends of the links are sacrificed.

The constant rotation of the member 41 and the variable rotation of the main shaft 14 are communicated to the epicyclic gearing through the respective pinions 44 and 52. The planetary disk 47 rotates under the influence of these two imposed rates of rotation and turns the final output shaft at a great variety of speeds.

The present invention is particularly adapted for use in connection with engine lathes, milling machines, etc. Variations of spindle speeds are made because of the changing diameters being worked upon by the actual cutting tools, and quite generally these machines are found to run the greater part of the time on small diameter work. The speeds, accordingly, will be fairly high, especially with the present state of development of high-speed cutting tools. When, therefore, the spindle speeds lie within an upper range of from 575 R. P. M. to 1575 R. P. M., for example, the epicyclic gearing would always be working under a load and doing no useful work. In the modification shown in Fig. 3 this loss in mechanical efficiency at high speeds is eliminated by the substitution of a selective-speed change gearing for the epicyclic gearing shown in Fig. 1. In Fig. 3, 53 denotes a pinion keyed to the variable-speed output shaft 14. This pinion meshes with the gear 54 on shaft 55, which is parallel to the main shaft 14 and which runs continuously. On the end of shaft 55 is cut a toothed pinion 56, which meshes with the gear 57, which runs loosely on an output shaft 58, which latter is coaxial with the main shaft. A clutch gear 59 is splined to the final output shaft 58. In the position shown, the output shaft does not revolve. When the clutch gear 59 is moved to the left by any suitable means such as the pivoted arm 60, internal clutch teeth 61 on the clutch gear 59, mesh with external clutch teeth 62 on the end of pinion 53 and the output shaft is driven directly from the variable speed shaft. When the clutch gear 59 is moved to the first position to the right, it will mesh with the gear 63 affixed to shaft 55, and the output shaft 58 may thereupon rotate at a reduced speed. When the clutch gear 58 is moved to the second position to the right, the teeth 64 on the clutch gear engage the teeth 65 on gear 57, and power is transmitted from the variable speed shaft to the shaft 55 and from there through the gear 56 to the gear 57 on the final shaft 58, which latter then rotates at a still further reduced speed. By varying the number of teeth on the various gears, the three definite steps may be varied. If the maximum direct-drive speed is 1575 R. P. M. with a minimum drive speed of 525 R. P. M., the first position to the right may give a speed range of from 528 R. P. M., to 176 R. P. M., and the second position to the right may give a speed range of from 176 R. P. M. to 58 R. P. M.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. In a device of the character described, the combination comprising a shaft, a plurality of mechanisms angularly spaced about said shaft, a corresponding number of fixed pins, a corresponding number of sleeves respectively slidable along said pins and respectively connected with said mechanisms, a ring rotatable about said shaft and having inwardly-extending arms, and a plurality of links respectively and pivotally connecting said arms and said sleeves.

2. In a device of the character described, the combination comprising a driven power-transmitting shaft, a driving disk for said shaft non-rotatably mounted thereon, a plurality of rollers mounted as a train in power-transmitting relation and having parallel axes at an angle to said shaft, a second driving disk non-rotatably mounted on said shaft reactively driven by said roller-train, a fixed pin, a sleeve slidable along said pin and connected with said plurality of rollers, a ring rotatable about said shaft driven by and having an inwardly-extending arm and a link pivotally connecting said arm and said sleeve.

3. In a device of the character described, the combination comprising a driven power-transmitting shaft, a driving disk for said shaft non-rotatably mounted thereon, a plurality of secondary shafts disposed radially about said first-named shaft, rollers slidably mounted on each of said secondary shafts and bearing against said disk, a second disk non-rotatably mounted on said first-named shaft, a plurality of additional shafts disposed in parallel relation with said secondary shafts, additional rollers slidably mounted on said additional shafts and interposed between said first-named rollers and said second disk, a plurality of fixed elements, a plurality of means each connecting one of said rollers, one of said additional rollers and one of said fixed elements, a ring rotatable about said shaft and having inwardly-extending projections, and a plurality of links respectively and pivotally connecting said projections and said means.

4. In a device of the character described, the combination comprising a driven power-transmitting shaft, a driving disk for said shaft non-rotatably mounted thereon, a plurality of secondary shafts disposed radially about said first-named shaft, rollers slidably mounted on each of said secondary shafts and bearing against said disk, a second disk non-rotatably mounted on said first-named shaft, a plurality of additional shafts disposed in parallel relation with said secondary shafts, additional rollers slidably mounted on said additional shafts and interposed between said first named rollers and said second disk, a plurality of fixed elements, a plurality of means each connecting one of said rollers, one of said additional rollers and one of said fixed elements, a ring rotatable about said shaft and having inwardly-extending projections, a plurality of links respectively and pivotally connecting said projections and said means, and manual means adapted for rotating said ring and a constant-speed motor connected to one of said secondary shafts.

5. In a device of the character described, the combination comprising a driven shaft, a plurality of power-transmitting trains, each of said trains composed of a plurality of sets of elements, each of said sets transmitting power simultaneously to said shaft, each of said sets including elements which have rolling contact and which have other relative motion, one of said last-mentioned elements in each set being in power-transmitting contact with a similar element in another set, the points of contact between certain of said relatively movable elements being spaced to determine a polygon, said polygon determining a plane substantially perpendicular to said shaft, the points of contact between certain others of said relatively movable elements being spaced to determine a polygon, said second polygon determining a second plant substantially parallel to said first plane, the final element in each set of power-transmitting trains being mechanically associated with said shaft, whereby, when said final element undergoes a motion, said shaft is forced to undergo a motion also, the relative motion of the movable elements in any train being radial with respect to the axis of said shaft, one of said trains being adapted to be connected to a source of power, a bevel pinion associated with said one of said trains, and a bevel gear transmitting power from said one of said trains to the remainder of said trains whereby said elements in all of said trains roll at substantially the same rate.

6. In a device of the character described, the combination comprising a driven shaft, a plurality of power-transmitting trains, each of said trains being composed of a plurality of sets of elements, each of said sets transmitting power simultaneously to said shaft, each of said sets including elements which having rolling contact and which have other relative motion, one of said last-mentioned elements in each set being in power-transmitting contact with a similar element in another set, the points of contact between certain of said relatively movable elements being spaced to determine a polygon, said polygon determining a plane substantially perpendicular to said shaft, the points of contact between certain others of said relatively movable elements being spaced to determine a polygon, said second polygon determining a second plane substantially parallel to said first plane, the final element in each set of power-transmitting trains being mechanically associated with said shaft, whereby, when the said final element undergoes a motion, said shaft is forced to undergo a motion also, the relative motion of the movable elements in any train being radial with respect to the axis of said shaft, one of said trains being adapted to be connected to a source of power, a bevel pinion associated with said one of said trains at a point where said train is at a relatively large distance from said axis, and a bevel gear adapted for transmitting power from said one of said trains to the remainder of said trains whereby said elements in all of said trains roll at substantially the same rate.

7. In a device of the character described, the combination comprising a driven power-transmitting shaft, a driving disk for said shaft non-rotatably mounted thereon, a plurality of secondary shafts disposed radially about said first-named shaft, rollers slidably mounted on each of said secondary shafts and bearing against said disk at a plurality of points which determine a polygon, said polygon determining a plane substantially perpendicular to said driven shaft, a second disk non-rotatably mounted on said first-named shaft, a plurality of additional shafts disposed in parallel relation with said secondary shafts, additional rollers slidably mounted on said additional shafts and interposed between said first-named rollers and said second disk, the points of contact between said additional rollers and said second disk determining a polygon, said polygon determining a second plane substantially parallel to said first plane, one of said secondary shafts being adapted to be connected to a source of power, a plurality of bevel pinions respectively associated with each shaft of one of said pluralities of shafts and a bevel gear rotatable about said driven shaft and transmitting power between said shafts.

8. In a device of the character described, the combination comprising a driven power-transmitting shaft, a driving disk for said shaft non-rotatably mounted thereon, a plurality of secondary shafts disposed radially about said first-named shaft, rollers slidably mounted on each of said secondary shafts and bearing against said disk at a plurality of points which determine a polygon, said polygon determining a plane substantially perpendicular to said driven shaft, a second disk non-rotatably mounted on said first-named shaft, a plurality of additional shafts disposed in parallel relation with said secondary shafts, additional rollers slidably mounted on said additional shafts and interposed between said first-named rollers and said second disk, the points of contact between said additional rollers and said second disk determining a polygon, said polygon determining a second plane substantially parallel to said first plane, one of said secondary shafts being adapted to be connected to a source of power, a plurality of bevel pinions respectively associated with each shaft of one of said pluralities of shafts and a bevel gear rotatable about said axis and transmitting power between said shafts, the teeth on said gear being at a distance from said axis at least as great as the radius of said driving disk.

9. In a device of the character described, the combination comprising a driven power-transmitting shaft, a driving disk for said shaft fixedly attached thereto, a plurality of secondary shafts disposed radially about said first-named shaft, rollers slidably mounted on each of said secondary shafts and bearing against said disk, a second disk fixedly attached to said first-named shaft, a plurality of additional shafts disposed in parallel relation with said secondary shafts, additional rollers slidably mounted on said additional shafts and interposed between said first-named rollers and said second disk, constant-speed driving means connected to one of said secondary shafts, a plurality of bevel pinions respectively associated with each shaft of one of said pluralities of shafts, a bevel gear rotatable about said driven shaft and transmitting power between said shafts, the teeth on said gear being at a distance from said axis at least as great as the radius of said driving disk, radially movable frames respectively carrying each of said first-named rollers and its associated additional roller whereby the same are slid together, a plurality of fixed elements, a plurality of means connecting respectively said frames and said elements, a ring rotatable about said shaft and having inwardly-extending projections, and a plurality of pivotal links connecting said projections and said means.

10. A main shaft, a plurality of shafts extending radially from said main shaft, motive means attached to one of said plurality of radially extending shafts, means adapted for transferring energy from said plurality of radially-extending shafts to said main shaft, a planetary gear, means adapted for transferring energy from said main shaft to said gear, and a member adapted for transferring energy from said one of said plurality of radially extending shafts to the remainder of said plurality of radially-extending shafts and from said one of said plurality of radially-extending shafts to said gear.

11. A main shaft, a plurality of shafts extending radially from said main shaft, motive means attached to one of said plurality of radially-extending shafts, means adapted for transferring energy from said plurality of radially-extending shafts to said main shaft, a planetary gear, means adapted for transferring energy from said main shaft to said gear, and a member rotatable about said main shaft, and having a sleeve portion, a portion spaced from said shaft, teeth on said spaced portion meshing with said plurality of radially-extending shafts, and another toothed portion meshing with said planetary gear.

12. In a device of the character described, the combination comprising a driven power-transmitting shaft, a driving disk for said shaft fixedly attached thereto, a plurality of secondary shafts disposed radially about said first-named shaft, rollers slidably mounted on each of said secondary shafts and bearing against said disk, a second disk fixedly attached to said first-named shaft, a plurality of additional shafts disposed in parallel relation with said secondary shafts, additional rollers slidably mounted on said additional shafts and interposed between said first-named rollers and said second disk, a bevel gear on each of said first plurality of shafts, a planetary gear adapted for receiving two motions, means for transmitting one motion from said main shaft to said planetary gear, and a member rotatable about said main shaft and having a bevel gear integral therewith meshing with said bevel gears, and another tooth portion adapted for transmitting said second motion to said planetary gear.

RICHARD W. STANLEY.